(12) United States Patent
Schott et al.

(10) Patent No.: US 10,149,421 B2
(45) Date of Patent: Dec. 11, 2018

(54) ROTARY HARROW TOOL AND HARROW EQUIPPED WITH SUCH TOOLS

(71) Applicant: KUHN SA, Saverne (FR)

(72) Inventors: Thierry Schott, La Walck (FR); Herve Teitgen, Phalsbourg (FR)

(73) Assignee: KUHN SA, Saverne (FR)

( * ) Notice: Subject to any disclaimer, the term of this patent is extended or adjusted under 35 U.S.C. 154(b) by 66 days.

(21) Appl. No.: 15/332,577

(22) Filed: Oct. 24, 2016

(65) Prior Publication Data
US 2017/0112041 A1    Apr. 27, 2017

(30) Foreign Application Priority Data

Oct. 23, 2015 (FR) ...................................... 15 60127

(51) Int. Cl.
*A01B 23/00* (2006.01)
*A01B 27/00* (2006.01)
*A01B 33/10* (2006.01)

(52) U.S. Cl.
CPC .............. *A01B 23/00* (2013.01); *A01B 27/00* (2013.01); *A01B 33/106* (2013.01)

(58) Field of Classification Search
CPC ........ A01B 23/00; A01B 27/00; A01B 33/106
See application file for complete search history.

(56) References Cited

U.S. PATENT DOCUMENTS

| | | | | |
|---|---|---|---|---|
| 1,497,144 A | * | 6/1924 | Jackson | ................. A01B 15/06 172/724 |
| 2,906,015 A | * | 9/1959 | Piepho | .................. A01B 15/06 172/745 |

FOREIGN PATENT DOCUMENTS

| | | | | |
|---|---|---|---|---|
| DE | 2655792 A1 | * | 6/1978 | ............. A01B 15/06 |
| EP | 0891688 A1 | * | 1/1999 | ........... A01B 33/146 |
| EP | 1 346 621 A1 | | 9/2003 | |
| EP | 2445329 A1 | * | 5/2012 | ............. A01B 15/06 |
| EP | 2 545 757 A1 | | 1/2013 | |
| GB | 1228009 A | * | 4/1971 | ........... E21C 35/183 |
| GB | 1480057 A | * | 7/1977 | ........... B23K 31/025 |
| WO | WO-2008000989 A2 | * | 1/2008 | ............. A01B 15/06 |

OTHER PUBLICATIONS

Preliminary Search Report for French Patent Application No. 1560127, dated Sep. 5, 2016 (English translation provided).

* cited by examiner

*Primary Examiner* — Tara Mayo-Pinnock
(74) *Attorney, Agent, or Firm* — Oblon, McClelland, Maier & Neustadt, L.L.P.

(57) ABSTRACT

A rotary harrow tool includes a body with a lower part that has, in the zone of its lower end, a working portion capable of and designed for being engaged and displaced in the soil and is equipped with at least one element attached in the form of an insert constituting at least the active front edge and the active adjoining elongated face of the working portion at least of the tool. The upper insert, situated opposite the free or lower end of the second part, has a rounded inner corner. Each insert has a substantially plane structure with, viewed in section along a plane perpendicular to the active edge and to the active face, a variable thickness that decreases from its front longitudinal rim forming the active edge to its rear longitudinal rim mounted in the receiving site, while forming a bevel by cooperation with the support piece.

17 Claims, 5 Drawing Sheets

ROTARY HARROW TOOL AND HARROW EQUIPPED WITH SUCH TOOLS

BACKGROUND

The present invention relates to the field of machinery and agricultural equipment, more particularly the soil-preparation machines and their constituent parts, especially the wearing parts.

The invention relates more specifically to a soil-preparation tool for a rotary harrow, to a rotary harrow equipped with such tools and to a method for manufacturing these latter.

The soil-preparation tools considered in the present application encompass in particular but not limitatively the tools for rotary harrows of the type disclosed in document EP A 0891688 in the name of the Applicant. Such tools have a body with a first upper connecting part and a second lower part forming a blade, designed to prepare the soil.

The active or working portion of this blade extends from its free lower end over a particular height corresponding to the optimum working depth of the tool. It is this working portion that is capable of and designed for being engaged and displaced in the soil to loosen the ground and break up the clods: consequently it is subjected to considerable wear, which primarily affects the active face and of course the front rim and/or edge thereof, which is the first to come into contact with the ground during use of the tool in question.

The tools of these harrows are generally mounted in pairs on rotors which turn alternately in opposite directions of rotation, from which a particular orientation of the tools results, by specific conformation of their bodies, resulting in right-hand tools and left-hand tools.

To increase the life of the tools, it is known to treat the active parts with a filler metal in the form of cladding or coating, for example to provide a coating of tungsten carbide (compare with a tool known by the designation DURAKUHN—registered trademark).

It is also known to attach elements in the form of inserts of a hard and abrasion-resistant material (for example, metal carbide) at the level of the zones subjected to intense wear, in order to form the front edge and the active adjoining faces at least of the working portion of the tool. These inserts make it possible to maintain the regularity of working of the tool for a lengthy duration (by preserving the shape of the active portion) and to increase the life of the tools.

According to a first known solution, illustrated by document EP 2445329, for example, these inserts are mounted directly on the tool body, at the level of its active position, Nevertheless, this known solution is based on a complex shape of the inserts, in particular with a nose associated with a shoulder on the rear face, and it is not optimized for application to a rotary harrow tool.

According to a second solution, already implemented by the Applicant, the inserts are mounted on an intermediate support piece that itself is integral with the tool body.

In this second solution, the inserts define a wide-angle (especially greater than 90°) angular active edge with a central edge and two active faces (double bevel), which requires elevated power during driving of the corresponding tool.

BRIEF SUMMARY

The objective of the invention consists in providing a rotary harrow tool that is improved simultaneously in terms of life and of power consumed during the work of the tool, while employing inserts of simple shape.

To this end, the subject matter of the invention is a rotary harrow tool comprising a body with a first upper connecting part and a second lower part forming a blade, wherein the said second part has, in the zone of its free or lower end, a working portion capable of and designed for being engaged and displaced in the soil and is equipped with at least one element attached in the form of an insert constituting at least the active front edge and the active adjoining elongated face of the working portion at least of the tool, wherein the or each insert is mounted rigidly with conjugate shape in a hollow complementary receiving site of the portion of the body defining the working portion or of an intermediate support piece attached on or in this portion, wherein the tool is characterized in that the upper insert or the upper region of the single insert, situated opposite the free or lower end of the second part, has a rounded inner corner of convex shape and in that the or each insert has a substantially plane structure with, viewed in section along a plane perpendicular to the active edge and to the active face, a variable thickness that decreases from its front longitudinal rim forming the active edge to its rear longitudinal rim mounted in the receiving base, preferably against a shoulder of this latter, while forming a bevel by cooperation with the working portion and/or the support piece.

BRIEF DESCRIPTION OF THE DRAWINGS

The invention will be better understood by virtue of the description hereinafter relative to a preferred embodiment, provided by way of non-limitative example and explained with reference to the attached schematic drawings, wherein.

DETAILED DESCRIPTION

FIGS. 2 to 7 show, some only in part, a rotary harrow tool 1 comprising a body 2 with an first upper connecting part 2' and a second lower part 2" forming a blade, wherein the said second part 2" has, in the zone of its free or lower end 3, a working portion 4 capable of and designed for being engaged and displaced in the soil. This working portion has at least one attached element 5, 5', 5" (for coating and protection) in the form of an insert constituting at least active front edge 6 and active adjoining elongated face 7 of working portion 4 of at least tool 1. The or each insert 5, 5', 5" is mounted rigidly with conjugate shape in a hollow complementary receiving site 8, made in portion 4' of body 2 defining working portion 4 or of an intermediate support piece 9 attached on or in this portion 4.

In conformity with the invention, upper insert 5' or the upper region of single insert 5, situated opposite free or lower end 3 of second part 2", has a rounded inner corner 10 of convex shape. The or each insert 5, 5', 5" has a substantially plane structure with, viewed in section along a plane perpendicular to active edge 6 and active face 7, a variable thickness e that decreases from its front longitudinal rim forming active edge 6 to its rear longitudinal rim 11 mounted in receiving site 8, preferably against a shoulder 8' of this latter, while forming a bevel by cooperation with working portion 4 and/or support piece 9.

Thus the invention provides a tool 1 with a working portion 4, the reinforcement against wear, the operational efficacy and the shock resistance of which have been appreciably increased, while making it possible to provide a simple bevel shape of small angular aperture (for example, an angle at the apex α between 20° and 40°, preferably on the order of 25° to 35°), making it possible to limit the working power necessary for its use (since edge 6 is formed in its entirety by the insert or inserts, it can be very narrow).

Elongated face 7 constitutes one part at least, preferably a major part in terms of surface area, of the active face of the bevel constituting working portion 4.

Body portion 4' of second part 2" directly carrying the insert or inserts or support piece 9 itself already has a bevel shape (in section), wherein part of the inclined face and the edge are covered by the insert or inserts.

In addition, the provision of a decreasing thickness e makes it possible to optimize the ratio [wear and shock resistance/quantity of material of the insert(s)] while preferentially reinforcing the most highly stressed zone (front edge 6). In addition, a decreasing thickness from front edge 6 toward opposite rim 11 of the insert or inserts 5, 5', 5" makes it possible, for a given apex angle of working portion 4 (smallest possible angle, in order to limit the working power), on the one hand to have a larger increase in the complementary thickness of support piece 9 or of portion 4' of second part 2" (relative to a thickness, which would be constant, of the insert or inserts) and, on the other hand, to limit the height of shoulder 8' at the level of rim 11 (smaller stress concentration/reduced risk of breakage due to shocks).

The presence of a convex rounded inner corner 10 cooperating with a complementary rounded groove of receiving site 8 (at the level of shoulder 8') makes it possible to avoid a stress concentration transmitted by the insert or inserts 5, 5', 5" to support piece 9 and/or to cut-out lower part 4' of second part 2" of body 2 of tool 1 receiving support piece 9 or directly the insert or inserts 5, 5', 5" (and the height of which corresponds to the length of working portion 4). In effect, the mutual interlocking by cooperation, with intimate surface contact, of conjugate rounded shapes (preferably substantially circular) between single insert 5 or upper insert 5' and shoulder 8' of site 8, at the level of this corner 10, makes it possible to achieve a good stress distribution at the level of the entire surface of the corresponding interface.

In particular, the stresses transmitted in the plane of inserts 5, 5', 5" from front edge 6 and outer lower corner 13 are not concentrated in an angular zone but are distributed over a curved surface. As FIG. 3 in particular shows, the insert or inserts is or are embedded in the thickness of piece 9 or of part 4', while being flush and continuous at the level of the outer surface constituting the entire active face of tool 1.

The different technical arrangements of the invention mentioned hereinabove also make it possible to employ inserts 5, 5', 5" of simple shape, without nose or discontinuity or formation of specific mountings, in particular of projecting nature (conservation of a substantially rectangular section over the entire extent of the inserts).

In agreement with a preferred embodiment of the invention, illustrated in FIGS. 4 to 7, the single one-piece insert 5 or the composite insert constituted by several inserts 5', 5" has a substantially rectangular shape. The two opposite longitudinal sides of this rectangular shape correspond respectively to active edge 6 and rear longitudinal rim 11, while convex rounded corner 10 is situated between the said rear longitudinal rim 11 and upper transverse rim 11' of the said insert 5 or composite insert 5', 5", while being prolonged preferably as a bulging portion of the said upper transverse rim 11'.

As the aforesaid figures also show, convex rounded inner corner 10 borders active face 7 of working portion 4.

Preferably single insert 5 or the composite insert constituted by several inserts 5', 5" has a plane and flat general constitution of variable thickness (e). In addition, working portion 4 or, as the case may be, intermediate support piece 9 substantially has the form of a prism of triangular section and receiving site 8 is made in a lateral flank of the said prism, wherein the contact surface between this site 8 and single insert 5 or composite insert 5', 5" is plane and flat beyond the shoulder.

Thus, taking into account the advantageous shape of the insert or inserts 5, 5', 5" and their particular positioning on portion 4 or piece 9, the majority of the stresses and forces exerted on front edge 6 and on active face 7 is transmitted via the surface contact interface at the level of receiving site 8 directly into the massive part of the body of the said portion 4 or of the said piece 9. In addition, no particular shaping is necessary at the level of inserts 5, 5', 5" in order to mount them immovably on portion 4 or piece 9.

In agreement with an advantageous characteristic of the invention, which is apparent in particular in FIGS. 4 to 7, upper insert 5' or the upper region of single insert 5, situated opposite free or lower end 3 of second part 2", has a rounded outer corner 12 (leading to front edge 6), wherein upper transverse rim 11' of the said insert 5' or aforesaid region of insert 5 therefore has, by contiguous association of inner 10 and outer 12 corners, a convex rounded shape over its entire width (curved or rounded upper rim 11'), possibly with two different radii of curvature, that extends between front edge 6 and rear longitudinal rim 11. Furthermore, shoulder 8' of receiving site 8 has a groove 8" of concave rounded complementary shape, in its region cooperating with the said upper transverse rim 11'.

Such an arrangement provides a substantially flattened apex at the level of corner 12, with an angle that is distinctly larger than a right angle and that is joined in continuous manner with active front edge 6: this results in distinctly improved resistance to shocks and impacts (compared with an angular corner). The provision of a continuous rounding at the level of the upper transverse rim makes it possible not only to achieve optimized anchoring in site 8 but also to increase the bearing surface at the level of interface 5, 5'/8, 8' in this region of tool 1.

In agreement with another advantageous characteristic of the invention, it may be provided that lower insert 5" or the lower region of single insert 5, situated at the level of free or lower end 3 of second part 2", has a rounded outer lower corner 13 extending from front edge 6.

By creating a connection and a continuous joint at the level of this corner 13, between front edge 6 and the lower rim of single insert 5 or of lower insert 5", by the provision of a rounded conformation, it is possible considerably to increase the shock resistance of this region (compared with a sharp or angular apex), which is the most exposed of tool 1 during the working phase.

Preferably, the rounded rims of upper 12 and lower 13 outer corners are joined in continuous and smooth manner with active front edge 6.

Of course, support piece 9 or portion 4' of part 2" has, in the zone of their site 8 that coincides with this lower rounded lower corner 13, a similar outer rounded shape.

Figure 3:
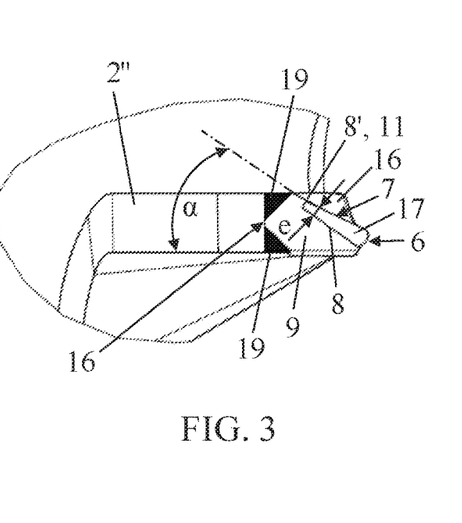
FIG. 3 is a sectional view along A-A of the tool represented in FIG. 1.

In particular, when second part 2" of body 2 of tool 1 is slightly twisted (see FIGS. 1 to 3), in such a way that the active edge is slightly inclined toward the interior of the circle described by the tool in working phase, it is possible to provide, as shown in FIG. 3, that edge 6 is protruding relative to working portion 4 and/or support piece 9, in the direction of displacement of second part 2" in working phase of tool 1, and has a rounded outer shape in cross section.

Concerning FIG. 3, it is pointed out that, because of the fact of the aforesaid characteristic, the maximum material thickness of the insert or inserts 5, 5', 5" is situated under edge 6, resulting in optimized protection of working portion 4.

In addition, the rounded tip shape, projecting in the direction of displacement of working portion 4 of edge 6 (FIG. 3), ensures a protective covering of the underlying front edge of piece 9 or of portion 4' without necessitating any flanging (thus conserving a plane insert shape) and achieves a distribution of stresses over the entire receiving site 8. The said edge 6 is therefore offset from the side of the active face of working portion 4 formed by face 7 of insert or inserts 5, 5', 5" and the contiguous face of piece 9 of portion 4'.

In this way, as FIG. 3 shows, a general bevel shape is obtained at the level of working portion 4 (viewed in section), with a protruding tip on the side of the inclined active face of the said bevel.

According to another advantageous characteristic of the invention, as FIGS. 2, 4 to 6 and 8B show, working portion 4 of second part 2" of body 2 of tool 1 or intermediate support piece 9 receiving insert or inserts 5, 5', 5" has, in zone 14 adjoining upper insert 5' or in the upper region of single insert 5, a width of L-shaped section that increases progressively from active edge 6 (or the edge of the bevel of portion 4) toward front rim or edge 15 of the portion of second part 2" extending above working portion 4.

The provision of such a progressive change of section from a broader part 9, 15 toward a narrower part 6 makes it possible, while avoiding any abrupt change of section, to eliminate any stress concentration zone that would weaken tool 1.

Figure 8A:
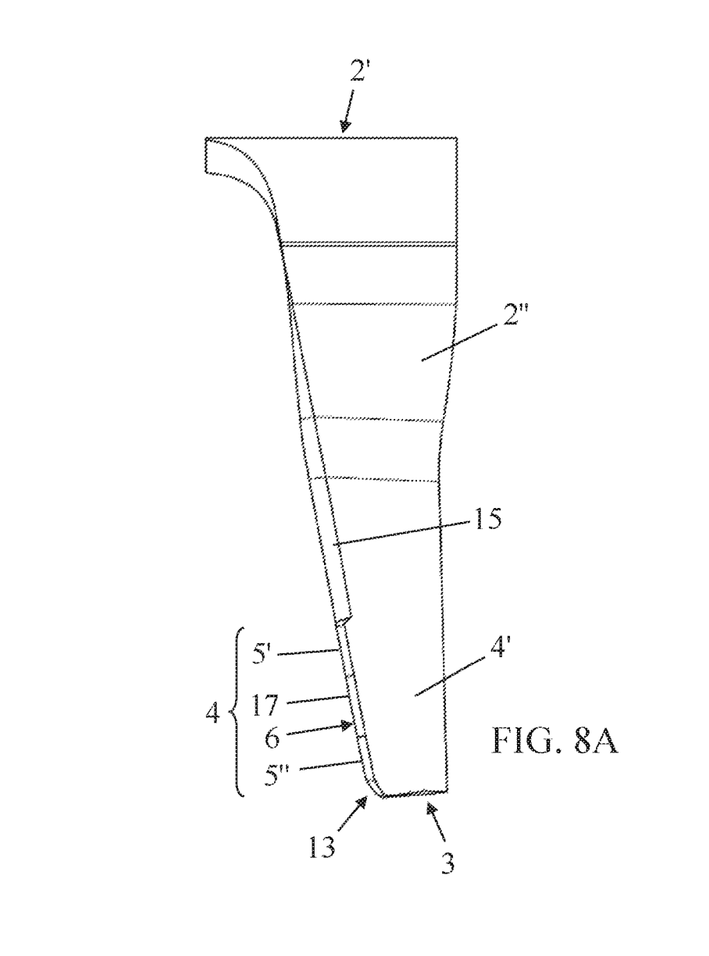
Figure 8B:
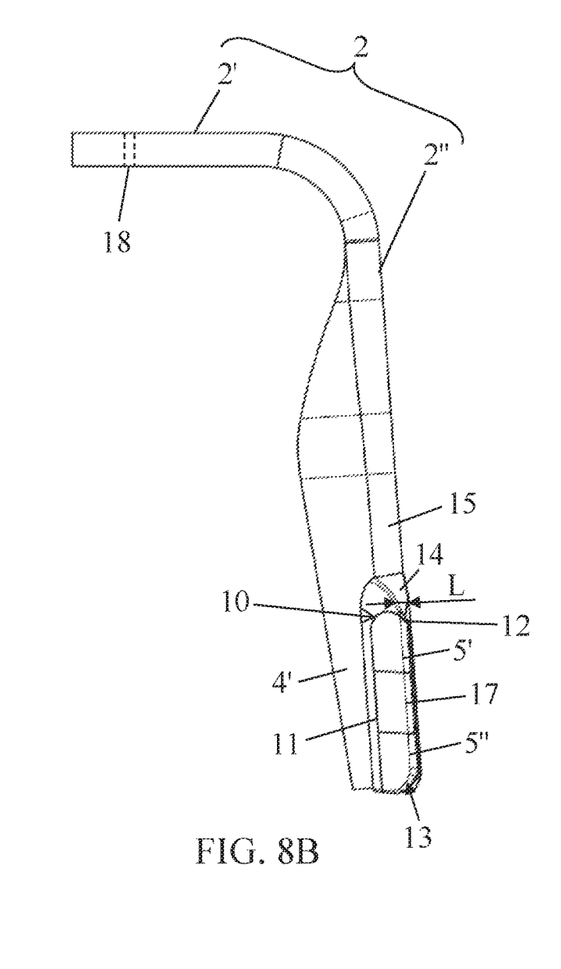

In conformity with a first embodiment, represented in FIGS. 8A and 8B, the or each insert 5, 5', 5" is mounted in a receiving site 8 formed directly in second part 2" of body 2 of tool 1 and is made integral with this part 2" by brazing.

In conformity with a second embodiment, which is apparent in FIGS. 2 to 7, the or each insert 5, 5', 5" is mounted in a receiving site 8 of an intermediate support piece 9, wherein this latter is itself mounted in a cutout or a housing site 16 made in second part 2" of body 2 of tool 1 or forms in totality working portion 4, wherein the or each insert 5, 5', 5" is made integral with support piece 9 by brazing and the said support piece 9 is itself made integral with the said second part 2" by welding.

The use of a support piece 9 makes it possible to conserve a standard shape for body 2 and its portion 4', while varying the shape of working portion 4, of piece 9, of site 8 and of insert or inserts 5, 5', 5".

Figures 4, 5, 6:
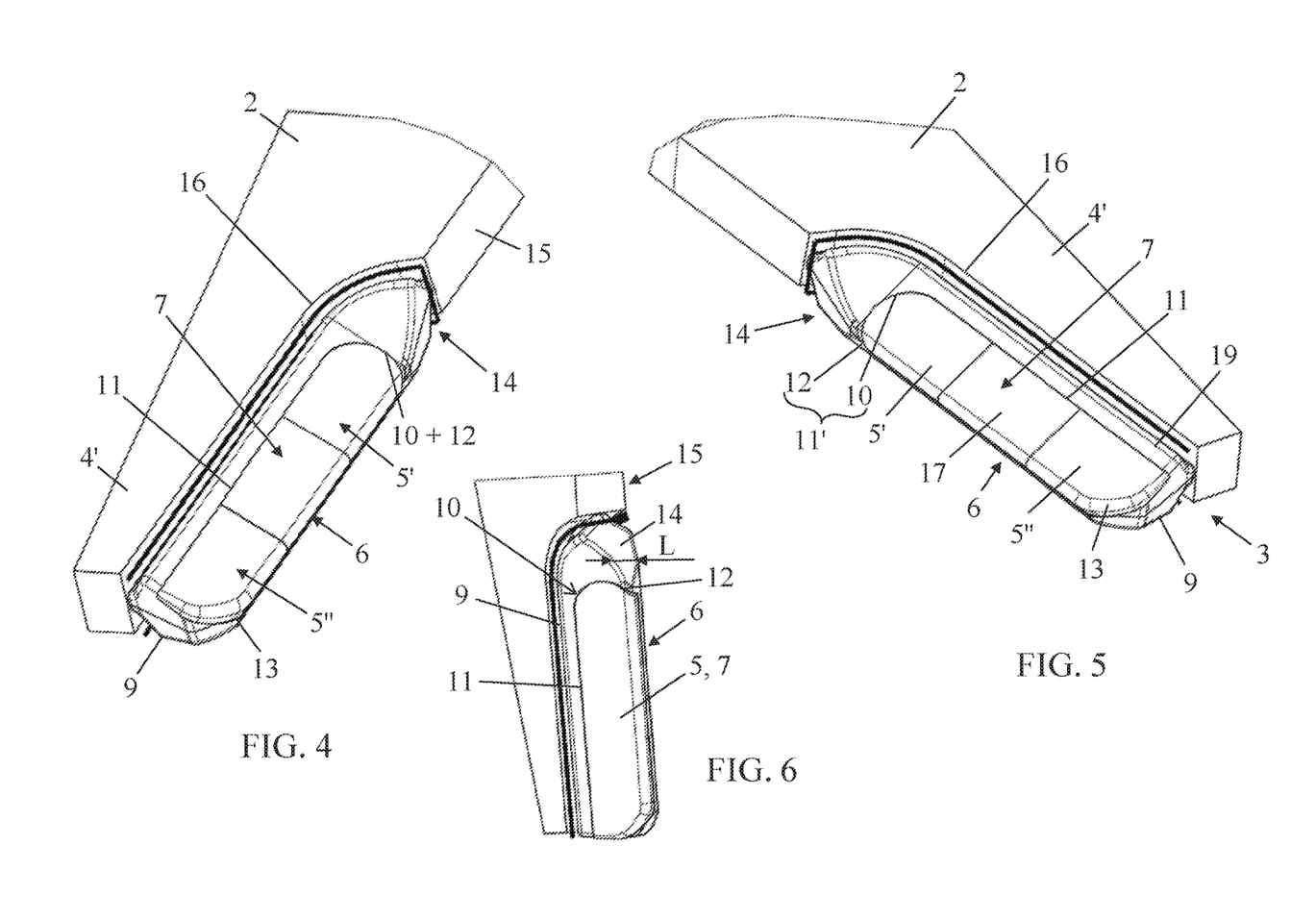
FIGS. 4 and 5 are partial views on a different scale of the working portions of tools with respectively right-hand blade (FIG. 4) and left-hand blade (FIG. 5) according to the invention.
FIG. 6 is a perspective view of an assembly [support piece/insert] forming part of the tool represented in FIG. 4, wherein the insert is made all in one piece.
Figure 7:
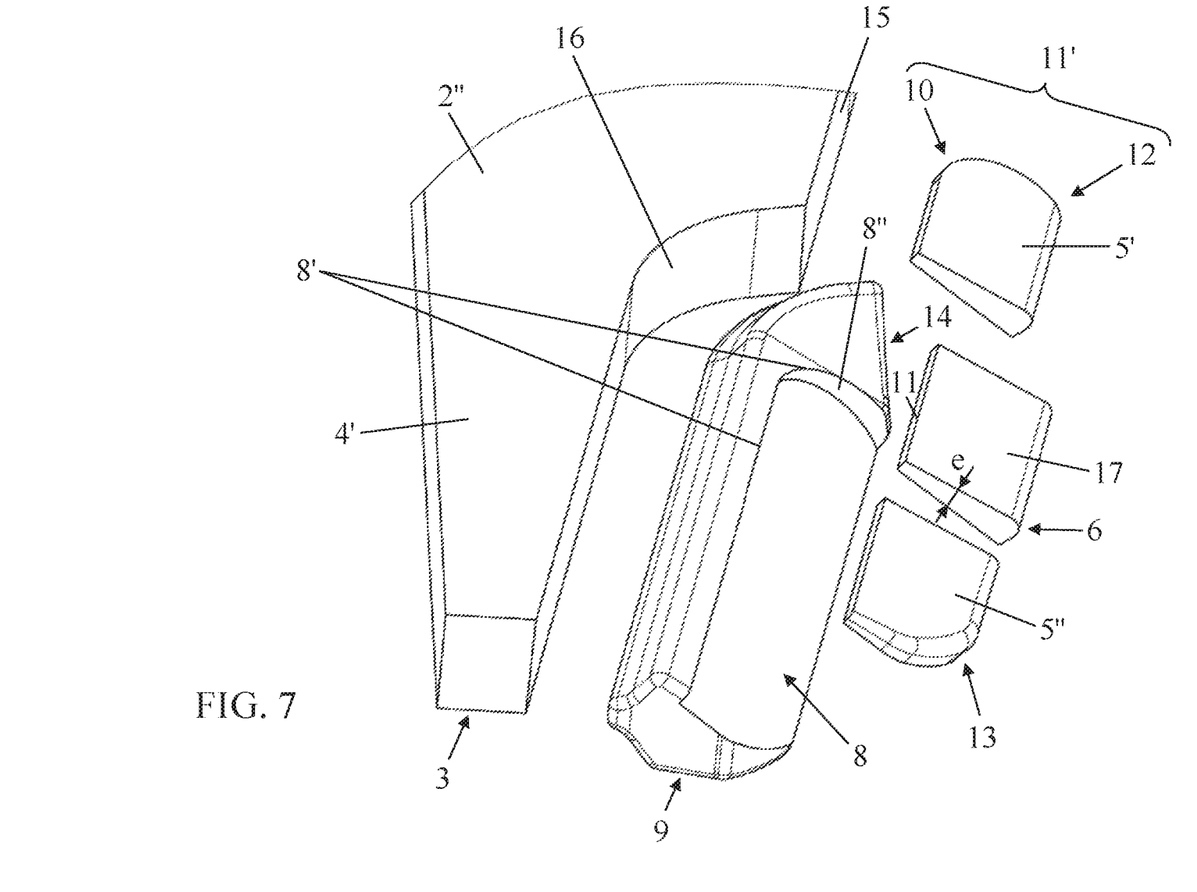
FIG. 7 is an exploded view of the working portion of the tool represented in FIG. 4, and FIGS. 8A and 8B are views similar to those of FIGS. 2A and 2B respectively of another embodiment of the invention, in which the inserts are fixed directly on the tool body.

In agreement with a first practical constructive variant, illustrated by FIG. 6, tool 1 may have a single insert 5 forming active edge 6 and active face 7 of working portion 4 of second part 2" of body 2 of tool 1 (or at least the majority of the surface of this face adjoining the edge), wherein this insert 5 advantageously has a rounded upper end over its entire width and a rounded lower end at the level of its front corner 13.

In agreement with a second practical constructive variant, illustrated by FIGS. 2 to 5 and 7, tool 1 has at least two separate elementary inserts 5' and 5", which together form a composite insert providing active edge 6 and active face 7 of working portion 4 of second part 2" of body 2 of tool 1 (or at least the majority of the surface of this face adjoining edge 6), in other words at least one upper insert 5' with a rounded upper end 10, 12 (forming rim 11') and at least one lower insert 5" with a rounded lower end at the level of its outer front corner 13, as well as, if necessary, at least one intermediate insert 17 disposed in adjoining and abutting manner between the said upper 5' and lower 5" inserts.

Figure 1:
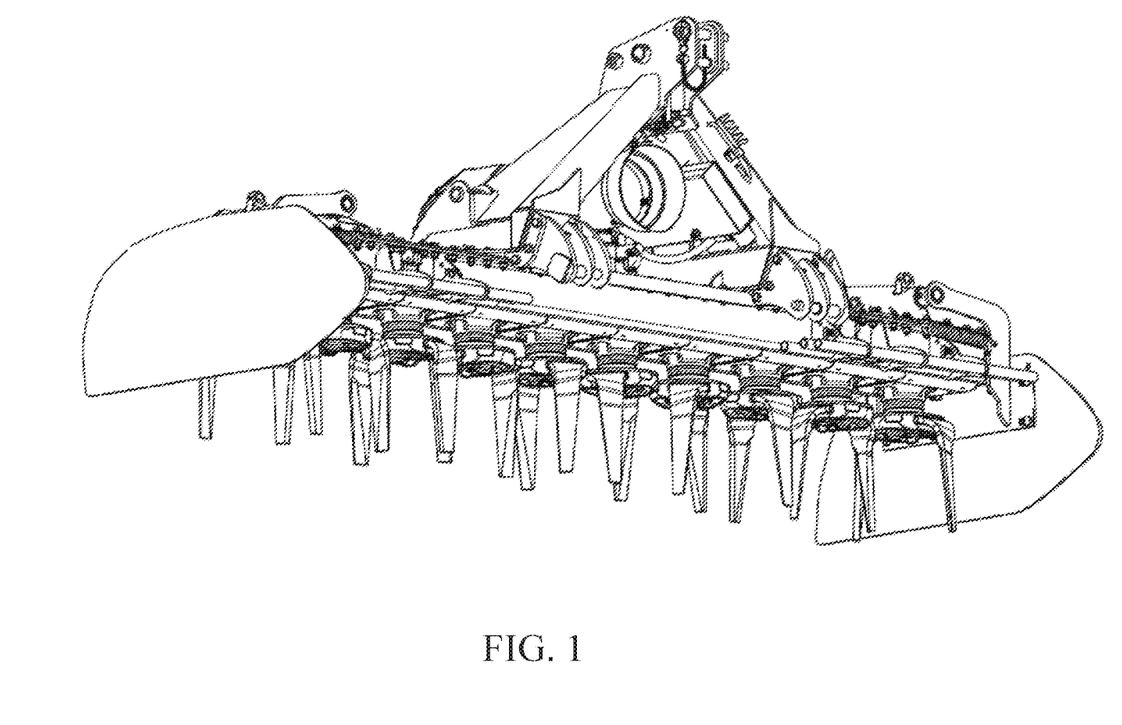
FIG. 1 is a perspective view of a rotary harrow equipped with known conventional tools.
Figure 2A:
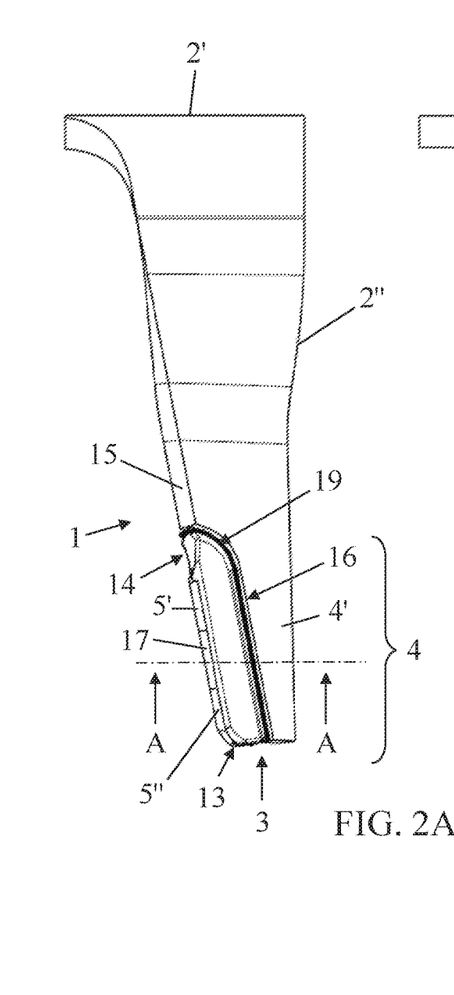
FIGS. 2A and 2B are elevation views in two mutually perpendicular directions of a rotary harrow tool according to one embodiment of the invention, in which the inserts are fixed on an intermediate support piece.
Figure 2B:
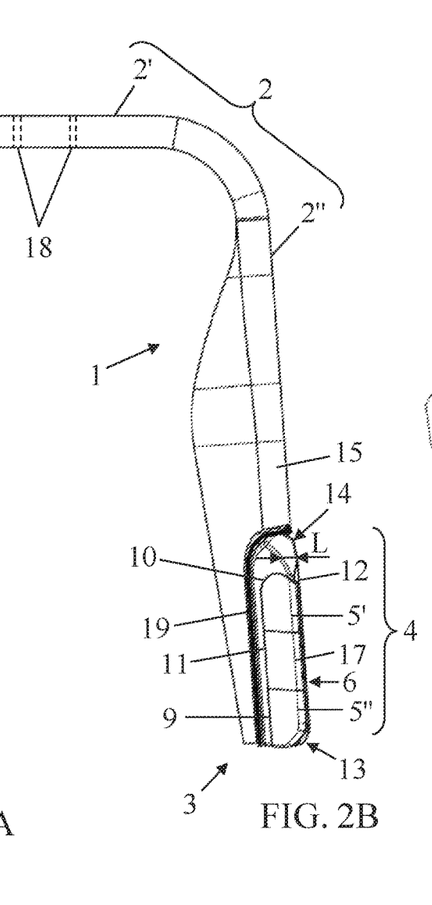

The invention also has as subject matter a rotary harrow, for example of the type represented in FIG. 1, comprising rotary tool-holding rotors, each preferably having a pair of opposite tools, wherein the harrow is characterized in that each tool consists of a tool 1 such as described in the foregoing.

Finally, the invention also relates to a method for manufacturing a tool 1 of the type described in the foregoing, which may be subdivided into two variants as a function of the presence or not of an intermediate support piece 9.

Thus, according to a first variant, the method may consist in providing an elongated metal insert by cutting, in performing hot-bending of the said insert to obtain an L-shaped body 2 with a first connecting part 2' and a second part 2" forming a blade, in making one or more fixation orifices 18 in first part 2', in machining receiving site 8 of one or more inserts 5, 5', 5", in mounting the said insert or inserts 5, 5', 5", of tungsten carbide, for example, in the aforesaid site 8 and making them integral therewith by brazing and, finally, in performing operations of heating, quenching and tempering of composite tool 1 resulting from the foregoing operations.

According to a second variant, the method may consist in providing an elongated metal insert by cutting, in performing hot-bending of the said insert to obtain an L-shaped body 2 with a first connecting part 2' and a second part 2" forming a blade, in making fixation orifices 18 in first part 2', in providing an intermediate support piece 9 then in mounting one or more inserts 5, 5', 5", of tungsten carbide, for example, on the aforesaid support piece 9 and making them integral therewith by brazing, in mounting support piece 9 carrying the insert or inserts 5, 5', 5" in a housing site 16 already obtained during the cutting operation and making it integral therewith by welding and, finally, in performing operations of heating, quenching and tempering of composite tool 1 resulting from the foregoing operations.

The final quenching operation guarantees a homogeneous hardness of the entire tool 1 (body 2+piece 9) and high wear resistance.

In addition, each tool 1 may be distinguished as right-hand or left-hand tool.

Of course, the invention is not limited to the embodiments described and represented in the attached drawings. Modifications are still possible, especially from the viewpoint of the constitution of the diverse elements or by substitution of equivalent techniques, albeit without going beyond the scope of protection of the invention.

The invention claimed is:

1. A rotary harrow tool, comprising:
a body with a first upper connecting part and a second lower part forming a blade, wherein the second part has, in a zone of a free or lower end, a working portion to be engaged and displaced in the soil and is equipped with at least one element attached in the form of an insert constituting at least an active front edge and an active adjoining elongated face of the working portion at least of the tool, wherein the at least one insert is mounted rigidly with conjugate shape in a hollow complementary receiving site of the portion of the body defining the working portion or of an intermediate support piece attached on or in the working portion,
wherein the at least one insert includes an upper insert or an upper region of a single insert, situated opposite the free or lower end of the second part, has a rounded inner corner of convex shape and the at least one insert has a substantially plane structure with, viewed in section along a plane perpendicular to the active edge and to the active face, a variable thickness that decreases from a front longitudinal rim forming the active edge to a rear longitudinal rim mounted in the receiving site, while forming a bevel by cooperation with the working portion and/or the support piece.

2. The tool according to claim 1, wherein the at least one insert has a substantially rectangular shape and two opposite longitudinal sides of the rectangular shape correspond respectively to the active edge and to the rear longitudinal rim, while the convex rounded corner is situated between the rear longitudinal rim and an upper transverse rim of the at least one insert, while being prolonged as a bulging portion of the upper transverse rim.

3. The tool according to claim 1, wherein the convex rounded inner corner borders the active face of the working portion.

4. The tool according to claim 1, wherein the rear longitudinal rim is mounted against a shoulder of the receiving site.

5. The tool according to claim 4, wherein the at least one insert has a plane and flat general constitution of variable thickness, the working portion or the intermediate support piece substantially has a form of a prism of triangular section, and the receiving site is made in a lateral flank of the prism, wherein a contact surface between the receiving site and the at least one insert is plane and flat beyond the shoulder.

6. The tool according to claim 4, wherein the upper insert or the upper region of the single insert, situated opposite the free or lower end of the second part, has a rounded outer corner, wherein the upper transverse rim of the at least one insert has, by contiguous association of the inner and outer corners, a convex rounded shape over its entire width that extends between the front edge and the rear longitudinal rim, and the shoulder of the receiving site has a groove of concave rounded complementary shape, in a region cooperating with the upper transverse rim.

7. The tool according to claim 6, wherein a lower insert or a lower region of the single insert of the at least one insert, situated at a level of the free or lower end of the second part, has a rounded outer lower corner extending from the front edge.

8. The tool according to claim 7, wherein the rounded rims of the upper and lower outer corners are joined in continuous and smooth manner with the active front edge.

9. The tool according to claim 1, wherein the active front edge is protruding relative to the working portion and/or to the support piece, in the direction of displacement of the second part in a working phase of the tool, and has a rounded outer shape in cross section.

10. The tool according to claim 1, wherein the working portion of the second part of the body of the tool or the intermediate support piece receiving the at least one insert has, in a zone adjoining the upper insert or in the upper region of the single insert, a width of section that increases progressively from the active edge toward a front rim or edge of the portion of the second part extending above the working portion.

11. The tool according to claim 1, wherein the at least one insert is mounted in the receiving site that is formed directly in the second part of the body of the tool and is made integral with the second part by brazing.

12. The tool according to claim 1, wherein the at least one insert is mounted in the receiving site of the intermediate support piece, wherein the intermediate support piece is mounted in a cutout or a housing site made in the second part of the body of the tool or forms in totality the working portion, wherein the at least one insert is made integral with the support piece by brazing and the support piece is made integral with the second part by welding.

13. The tool according to claim 1, wherein the at least one insert is a single insert forming the active edge and the active face of the working portion of the second part of the body of the tool, wherein the single insert has a rounded upper end over an entire width and a rounded lower end at a level of a front corner.

14. The tool according to claim 1, wherein the at least one insert is at least two separate elementary inserts, which together form a composite insert providing the active edge and the active face of the working portion of the second part of the body of the tool, the at least two separate elementary inserts including at least one upper insert with a rounded upper end and at least one lower insert with a rounded lower end at a level of an outer front corner as well as, at least one intermediate insert disposed in an adjoining and abutting manner between the upper and lower inserts.

15. A rotary harrow, comprising:
rotary tool-holding rotors, each having a pair of opposite tools, wherein each of the opposite tools includes the tool according to claim 1.

16. A method for manufacturing the tool according to claim 1, comprising:
providing an elongated metal insert by cutting;
performing hot-bending of the insert to obtain an L-shaped body with a first connecting part and a second part forming a blade;
making one or more fixation orifices in the first part;
machining a receiving site of one or more inserts;
mounting the one or more inserts in the receiving site and making the one or more inserts integral with the receiving site by brazing to make a composite tool; and
performing, after the mounting, operations of heating, quenching and tempering of the composite tool.

17. A method for manufacturing a tool according to claim 1, comprising:
providing an elongated metal insert by cutting;
performing hot-bending of the insert to obtain an L-shaped body with a first connecting part and a second part forming a blade;

making one or more fixation orifices in the first part;
providing an intermediate support piece;
mounting, after the providing the intermediate support piece, one or more inserts on the support piece and making the one or more inserts integral with the support piece by brazing;
mounting the support piece carrying the one or more inserts in a housing site already obtained during the cutting and making the support piece carrying the one or more inserts integral with the housing site by welding to form a composite tool; and
performing, after the mounting the support piece, operations of heating, quenching and tempering of the composite tool.

* * * * *